(12) United States Patent
Menashe et al.

(10) Patent No.: US 9,393,772 B2
(45) Date of Patent: Jul. 19, 2016

(54) METHOD AND SYSTEM FOR REGISTERING PRINTING STATIONS OF A PRINTING PRESS

(71) Applicant: Advanced Vision Technology (AVT) Ltd., Hod Hasharon (IL)

(72) Inventors: Ohad Menashe, Tel-Aviv (IL); Dan Zamir, Hod Hasharon (IL); Shahar Golan, Petah Tikvah (IL); Haim Kreitman, Kfar Saba (IL)

(73) Assignee: Advanced Vision Technology (AVT) Ltd., Hod Hasharon (IL)

( * ) Notice: Subject to any disclaimer, the term of this patent is extended or adjusted under 35 U.S.C. 154(b) by 284 days.

(21) Appl. No.: 13/886,013

(22) Filed: May 2, 2013

(65) Prior Publication Data

US 2013/0305945 A1 Nov. 21, 2013

Related U.S. Application Data

(60) Provisional application No. 61/641,563, filed on May 2, 2012, provisional application No. 61/817,885, filed on May 1, 2013.

(51) Int. Cl.
*B41F 13/12* (2006.01)
*B41F 33/00* (2006.01)
*B41F 13/02* (2006.01)

(52) U.S. Cl.
CPC ............ *B41F 13/12* (2013.01); *B41F 13/025* (2013.01); *B41F 33/0036* (2013.01); *B41P 2233/52* (2013.01)

(58) Field of Classification Search
CPC ............ B41F 33/0036; B41F 33/0081; B41F 13/025; B41F 13/12; B41P 2233/52; H04N 1/60; H04N 1/54; H04N 1/58
See application file for complete search history.

(56) References Cited

U.S. PATENT DOCUMENTS 5,570,633 A 11/1996 Schultz et al.
5,625,762 A * 4/1997 Takizawa et al. ............. 345/591
(Continued)

FOREIGN PATENT DOCUMENTS

DE 198 55 177 6/2000
DE 202011109630 U1 2/2012
(Continued)

OTHER PUBLICATIONS

European Search Report issued in corresponding European Patent Application 13166188, Apr. 26, 2016 (6 pages).

*Primary Examiner* — Matthew G Marini
*Assistant Examiner* — Leo T Hinze
(74) *Attorney, Agent, or Firm* — Merchant & Gould P.C.

(57) ABSTRACT

A system for registering printing presses includes printing stations for printing color images on a web includes an imager acquiring images of a web common area. The acquired image includes a portion of a color image associated with a printing station and a portion of one other color image associated with an un-registered printing station and a processor, coupled with the imager. A portion of the color image is registered with a portion of the other color image according to two monochrome images, each corresponding to a color image printed on the common area and determined according to the location of each pixel of the acquired image in a color separation space, the location is determined according to the projected location on a color projection plane. The portion of the one color image is registered with the portion of the one other color image with a reference image.

14 Claims, 13 Drawing Sheets

(56) References Cited

U.S. PATENT DOCUMENTS

| | | | |
|---|---|---|---|
| 5,689,425 A | 11/1997 | Sainio | |
| 5,764,386 A | 6/1998 | Robinson | |
| 5,806,430 A | 9/1998 | Rodi | |
| 5,812,705 A | 9/1998 | Wang et al. | |
| 5,813,333 A | 9/1998 | Ohno | |
| 5,857,784 A | 1/1999 | Allen | |
| 5,974,967 A | 11/1999 | Bravenec | |
| 6,024,018 A | 2/2000 | Darel et al. | |
| 6,129,015 A * | 10/2000 | Dewey | 101/211 |
| 6,782,814 B2 * | 8/2004 | Tokiwa | 101/211 |
| 6,796,240 B2 | 9/2004 | Sainio | |
| 7,040,232 B2 | 5/2006 | Van Holten et al. | |
| 7,219,606 B2 | 5/2007 | Mindrup | |
| 7,440,138 B2 * | 10/2008 | Hofman | 358/3.01 |
| 7,477,420 B2 | 1/2009 | Friedman et al. | |
| 7,826,095 B2 | 11/2010 | Wang et al. | |
| 7,894,098 B1 | 2/2011 | Dalton | |
| 7,966,935 B2 * | 6/2011 | Loddenkoetter et al. | 101/481 |
| 7,969,613 B2 | 6/2011 | Honeck et al. | |
| 2002/0026879 A1 | 3/2002 | Goldstein | |
| 2004/0163562 A1 | 8/2004 | Lewis, Jr. et al. | |
| 2005/0283722 A1 | 12/2005 | Warmus et al. | |
| 2007/0113748 A1 | 5/2007 | Geissler et al. | |
| 2011/0216120 A1 | 9/2011 | Friedman et al. | |

FOREIGN PATENT DOCUMENTS

| | | |
|---|---|---|
| EP | 1 428 659 | 3/2006 |
| EP | 2 327 548 | 6/2011 |
| WO | WO 2006/081950 | 8/2006 |
| WO | WO 2012/039719 | 3/2012 |

* cited by examiner

METHOD AND SYSTEM FOR REGISTERING PRINTING STATIONS OF A PRINTING PRESS

This application is a claims benefit of U.S. Provisional Ser. No. 61/641,563, filed 2 May 2012 and U.S. Provisional Ser. No. 61/817,885, filed 1 May 2013 and which application are incorporated herein by reference. To the extent appropriate, a claim of priority is made to each of the above disclosed applications.

FIELD OF THE DISCLOSED TECHNIQUE

The disclosed technique relates to setting up printing presses in general, and to methods and systems for registering the printing stations of the printing press without requiring registration marks or targets, in particular.

BACKGROUND OF THE DISCLOSED TECHNIQUE

A printing press includes a plurality of printing stations. Each printing station prints a respective color image on a common area on the web. The color image exhibits a respective color. Thus, the printing press forms a printed image on the web. The color of each color image may be a process color in a color gamut such as Cyan Yellow, Magenta and Black (i.e., CYMK) or Red, Green and Blue (i.e., RGB) or a pantone color. A pantone color is a specially manufactured color that cannot be accurately produced from a combination of basic process colors. For the image to be printed correctly, the printing stations in the printing press must be in register with each other (i.e., each station prints the respective color image thereof at the respective location associated therewith), such that the images to be printed shall all be printed in the correct relative positions in the common area on the web.

U.S. Pat. No. 5,812,705 to Wang et al, entitled "Device for automatically aligning a production copy image with a reference copy image in a printing press control system", directs to a system which includes a 4 CCD camera coupled with a computer. The 4 CCD camera is operative to acquire an image of reference print in Red, Green, Blue and Infrared. This reference print serves as a hard proof of the live print. The reference image is converted into a monochrome image. Four object models are identified at each quadrant of the reference image. These object models are features in the image (i.e., transitions from dark to light) within a quadrant.

During the registration, the 4 CCD camera acquires a live image of the print. The live image is converted into a monochrome image. The computer then looks for a model within the models search region. Each potential find is given a score indicating the likelihood that the model was actually found. When the computer declares that the model was found (i.e., according to the score thereof), the computer defines a transfer function which maps the position of the found model to the position of the model found in the reference image.

U.S. Pat. No. 6,129,015 to Dewey, entitled "Method and apparatus for registering color in a printing press" directs to a method including the steps of identifying an area of the desired image that is intended to be printed in black, and forming registration images on the plate cylinders of the printing stations. The registration images are positioned on the plate cylinders such that, during subsequent printing operations, they will produce color registration marks that cooperate to print a process black registration mark on the web in the identified area (i.e., when the printing stations are in registration). The publication to Dewey further directs to a method comprising the steps of passing a web through the plurality of printing stations and printing a process black registration mark on the web. Furthermore, a black ink image on the web, adjacent to the process black registration mark, is printed. Thereafter, the process black registration mark and the black ink image are examined and an error signal is generated when the process black registration mark is not in desired registration relative to the black ink image. It is noted that the term 'registration marks' in the publication to Dewey refers to part of the image that is printed in process black and not in black.

U.S. Pat. No. 5,689,425 to Sainio, entitled "Color registration system for a printing press", directs to a system for generating a signal representing a color registration offset between at least two colors of an image, printed on a web. The system includes a memory which stores two reference arrays of digital data representative of the colors of at least a portion of the image. An imaging device is arranged in optical communication with the web, to produce analog signals representing the colors of the portion of the image. The system also includes a converter circuit which converts the analog signals to a color array of digital data. These arrays are stored in memory. The system further includes a processing circuit in communication with the converter circuit and the memory. For each color, the processing circuit, phase correlates the reference array of one color with the on-press array of that same color and phase, and determines a registration offset between the colors. The processing circuit produces a signal representing the registration offset between the colors.

PCT Publication WO 2006/081950, to Loddenkoetter et al, entitled "Registering Method", directs to a method for registering a rotary press with a plurality of inking mechanisms. According to the method directed to by Loddenkoetter et al, a longitudinal screen mark and a horizontal screen mark are mounted at a fixed position on the frame of the rotary press in front of an optical sensor. These screen marks represent the required position of the printed image. Each printing station, in the rotary printing, prints the respective image thereof. An optical sensor acquires an image of the printed images. The position of the printed images relative to the screen marks are apparent on the image acquired by the optical sensor. An operator adjusts the location of the printed image accordingly, until the printed images are flush with the screen mark.

German patent application DE19855177, to Krumpelmann, entitled "Method for the Automatic Adjustment of Circumference and Side Registers of Press Cylinders", directs to a method for adjusting individual printing units in a printing press. Each printing unit prints a print image. The printing press prints superimposed print images. The method includes the steps of selecting a print image printed by a printing unit as a reference image, recording with a camera the superimposed print images and comparing the actual position of the print images with respect to each other, and with respect to the desired position of each print image. The method further includes the steps of generating correcting signals for adjusting the press cylinders circumferential or side registers and actuating motors of the press cylinders according to the generated correcting signals. The reference print image may be the first print image or one that exhibits simple composition.

SUMMARY OF THE PRESENT DISCLOSED TECHNIQUE

It is an object of the disclosed technique to provide a novel method and system for registering the printing stations of a printing press without the use of registration marks or targets.

In accordance with the disclosed technique, there is thus provided a system for registering a printing press. The printing press includes a plurality of printing stations each for printing a respective color image on a web. Each of the printing stations is associated with a respective different color. At least two of the printing stations are un-registered. The system includes an imager coupled a processor. The imager acquires an image of a common area of the web. The driver side of the acquired image includes at least a portion of at least one color image associated with at least one respective un-registered printing station. The operator side of the acquired image includes at least a portion of at least one other color image associated with at least a respective other un-registered printing station. The processor registers the at least two un-registered printing stations, by registering the at least a portion of the at least one color image with at least a portion of the at least one other color image according to at least one of the following:

registering at least two monochrome images. Each monochrome image corresponding to a color image printed on the common area. Each monochrome image being determined according to the location of each pixel of the acquired image in a color separation space. The location of each pixel in the color separation space being determined according to the projected location of each pixel of the acquired image on a color projection plane. The color projection plane is determined according to the coordinates of the color associated with each the un-registered printing stations and the coordinates of the color of the web in a selected color space registering the at least the portion of the at least one color image in the driver side with the at least the portion of the at least one other color image in the operator the with a reference image.

In accordance with another aspect of the disclosed technique, there is thus provided a method for registering a printing press. The printing press includes a plurality of printing stations each for printing a respective color image on a web. Each of the printing stations is associated with a respective different color. At least two of the printing stations are un-registered. The method includes the procedures of printing on the driver side of a common area of the web, at least a portion of at least one color image associated with at least one respective un-registered printing station, printing on the operator side of the common area of the web at least a portion of at least one other color image associated with at least a respective other un-registered printing station and acquiring an image of the common area of the web, the driver side of the acquired image including the at least a portion of the at least one color image and the operator side of the acquired image including the at least a portion of at least one other color image. The method further including the procedures of registering the at least two un-registered printing stations, by registering the at least a portion of the at least one color image with at least a portion of the at least one other color image according to at least one of the following:

registering at least two monochrome images. Each monochrome image corresponding to a color image printed on the common area. Each monochrome image being determined according to the location of each pixel of the acquired image in a color separation space. The location of each pixel in the color separation space being determined according to the projected location of each pixel of the acquired image on a color projection plane. The color projection plane is determined according to the coordinates of the color associated with each the un-registered printing stations and the coordinates of the color of the web in a selected color space registering the at least the portion of the at least one color image in the driver side with the at least the portion of the at least one other color image in the operator the with a reference image.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
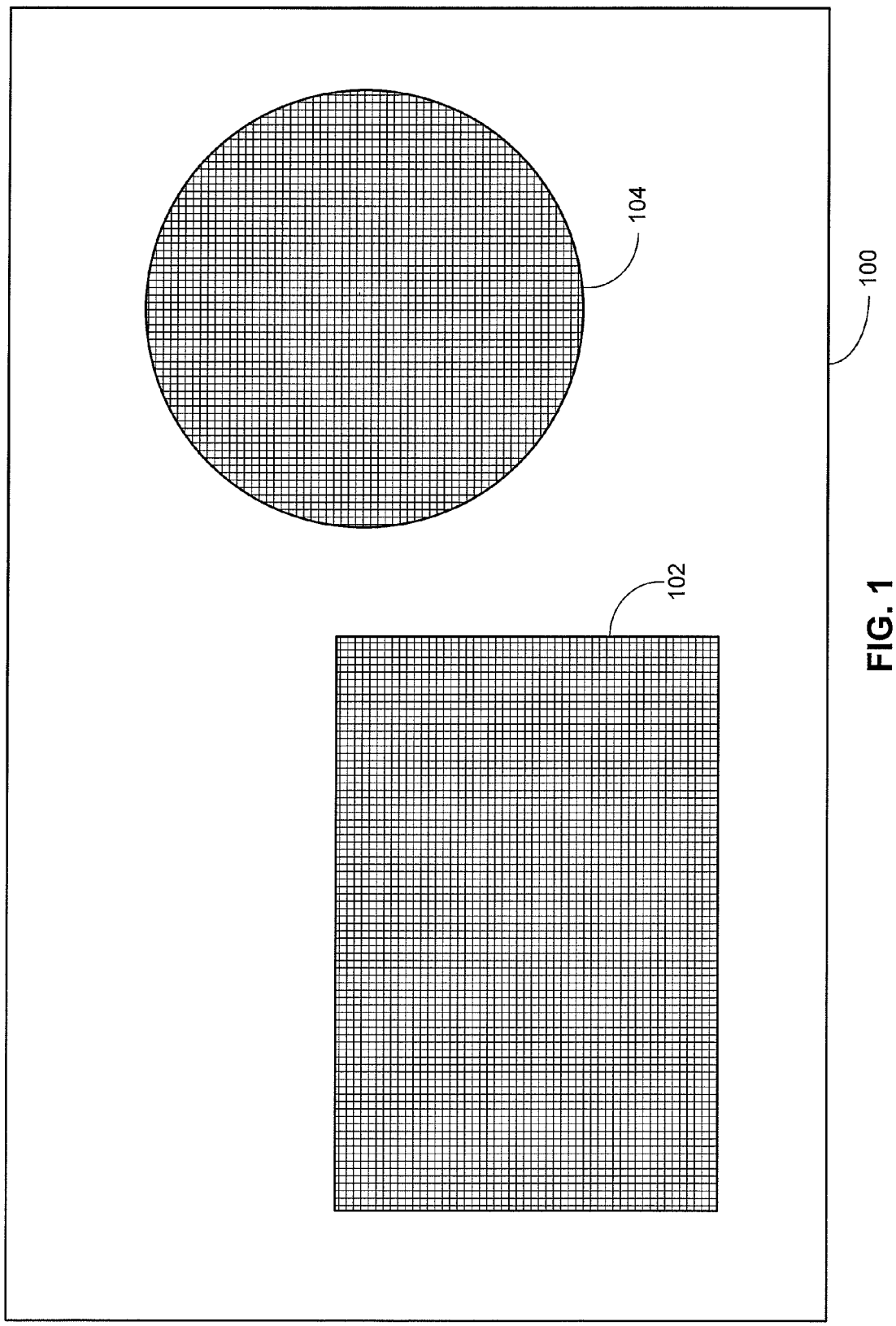
FIG. 1 is a schematic illustration of an exemplary image, in accordance with an embodiment of the disclosed technique.

The disclosed technique overcomes the disadvantages of the prior art by providing a method and a system for registering the printing stations of a printing press without the use of registration marks or targets. As mentioned above each image is composed of a plurality of color images. Each color image is associated with a respective color. Each color image is printed on respective location in a common area on the web, by a corresponding printing station. Since the printed stations may not be in register one with respect to the other, the color images may not be printed on the respective location thereof. The term "printing station" herein refers to printing stations which transform the appearance a web (e.g., by transferring ink onto the web or by coating the printed or unprinted web) as well as transforming the shape of the web (e.g., by embossing the web).

Two selected printing stations are registered by printing on the web each of the two corresponding selected color images, composing a part of the image to be printed. The two printed color images may exhibit overlap of the design features to be printed, one with respect to the other. An imager acquires an image of the common area of the web and the composite printed image thereon (i.e., composed of the two colors). However, to register the two printing stations, the two printed color images should be separated from the composite image (i.e., two separate images should be determined from the composite printed image on the web, one for each color). Thus, the location on the web of one selected color image relative to the other selected color image can be determined. According to the disclosed technique, the two selected color images are either chromatically separated or spatially separated, to determine at least a portion of each of the two selected color images. These determined portions of the selected color images are registered one with respect to the other. Consequently, the printing stations associated with these two color images are also registered one with respect to the other. All the printing stations in the printing press are registered one with respect to the other by registering N−1 different pairs of printing stations, where N is the number of printing stations in the printing press.

According to the disclosed technique, two selected color images are chromatically separated by simultaneously printing the two selected color images on the common area of the web and acquiring an image of the printed color images. The color coordinates (i.e., the location), in a selected color space, of each pixel in the acquired image, are determined. A color projection plane, in the selected color space, is also determined. This color projection plane is defined by the coordinates, in the selected color space, of the background (i.e., the color of the web) and the coordinates of the colors of each of the two selected colors images. The location of each pixel in the selected color space is projected on the color projection plane. The color projection plane is then transformed to a two-dimensional color separation space. Each axis in the two-dimensional color separation space corresponds to a respective one of the un-registered colors. Each projected pixel is then associated with a respective location in the two-dimensional color separation space. For each color, a respective monochrome image is determined according to the coordinate value (i.e., in the two-dimensional color separation space) of each pixel, corresponding to that color. The two monochrome images are then registered one with respect to the other either directly or with respect to a respective color layer in a reference image. Thus, the printing stations corresponding to the two color images are registered one with respect to the other.

Further according to the disclosed technique, the two selected color images are spatially separated by printing a portion of one color image on one side of the common area of the web, and printing a portion of the other color image on the opposite side of the common area of the web. Generally, a press machine has two sides. One side is the operator side, where the operator stands and along which he walks while working. The opposite side to the operator side is the driver side where the printing press is located. An imager acquires an image of the common area with the two portions printed thereon and a processor registers each side of the acquired image with a respective color layer in reference image of the multi-color image to be printed. Thus, the two color images, and consequently the two respective printing stations, are registered one with respect to the other.

Reference is now made to FIG. 1, which is a schematic illustration of an exemplary image, generally referenced 100, in accordance with an embodiment of the disclosed technique. Image 100 includes two objects, a rectangle 102 and a circle 104. Rectangle 102 and circle 104 in image 100 are composed of two color images, each exhibiting a respective color. The color respective of the first color image is represented by horizontal lines and the color respective of the second color image is represented by vertical lines. In general, each image to be printed on a web may be composed of a plurality of color images, together forming a multi-color image to be printed on a common area on the web. For image 100 to be printed correctly, the printing stations printing of the printing press, which print the color images composing image 100, should all be registered one with respect to the other. In other words, each printing station, should print the respective color image thereof, at the location corresponding to that color image in the common area on the web. In image 100, the color image represented by the horizontal lines is registered with respect to the color image represented by the vertical lines.

Figure 2:
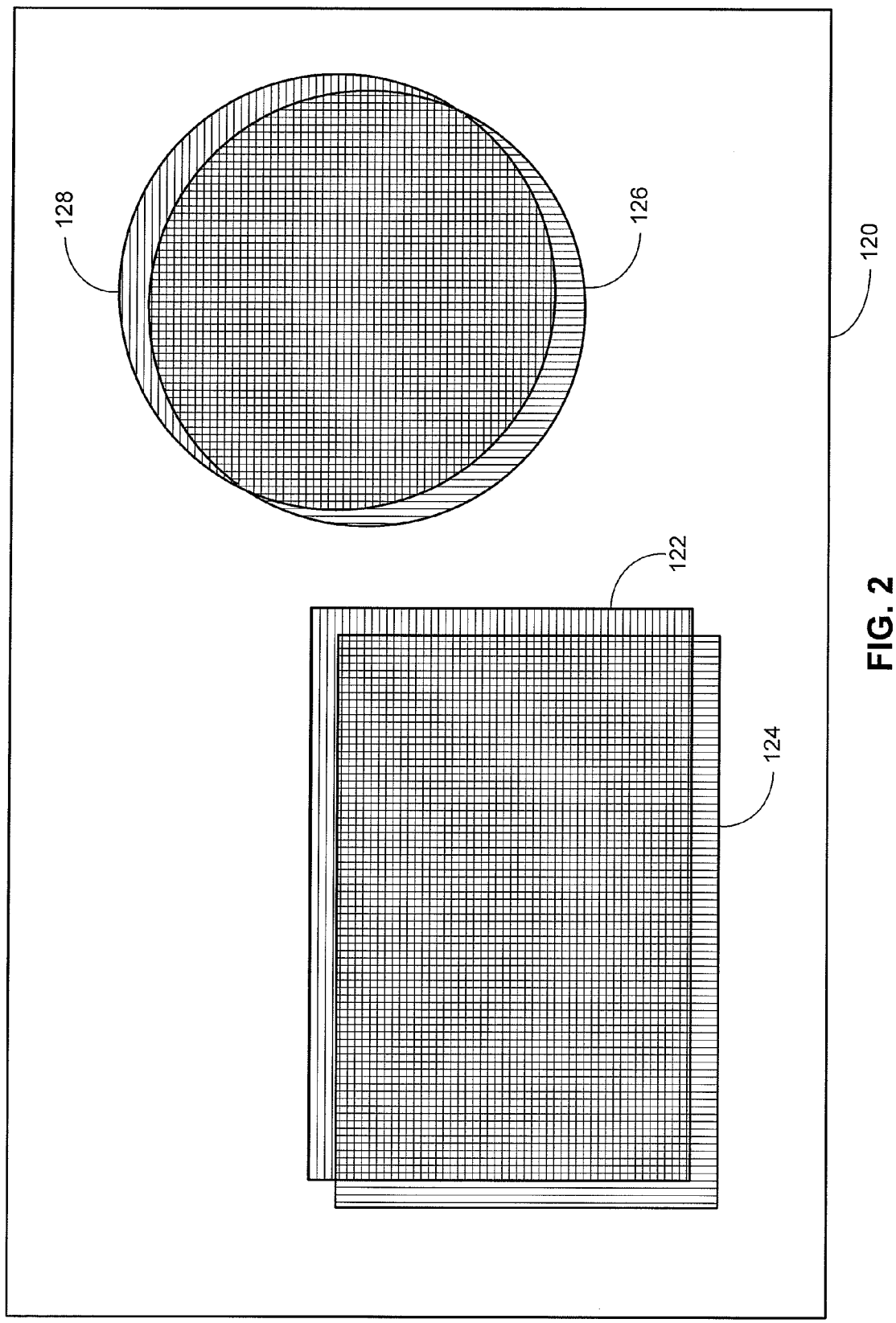
FIG. 2 is a schematic illustration of an exemplary image, in accordance with another embodiment of the disclosed technique where the two printing stations corresponding to the printed color images are not registered one with respect to the other.

Reference is now made to FIG. 2, which is a schematic illustration of an exemplary image, generally referenced 120, in accordance with another embodiment of the disclosed technique where the two printing stations corresponding to the printed color images are not registered one with respect to the other. Similar to Image 100 (FIG. 1), image 120 is composed of two color images. The first color image is represented by horizontal lines and the second color image is represented by vertical lines. In image 120, the two color images are not registered. Thus, the image to be printed is not printed as intended. In image 120 rectangle 122 and circle 128 of the first color image are visible on image 120 as well as rectangle 124 and circle 126 of the second color image.

Figure 3:
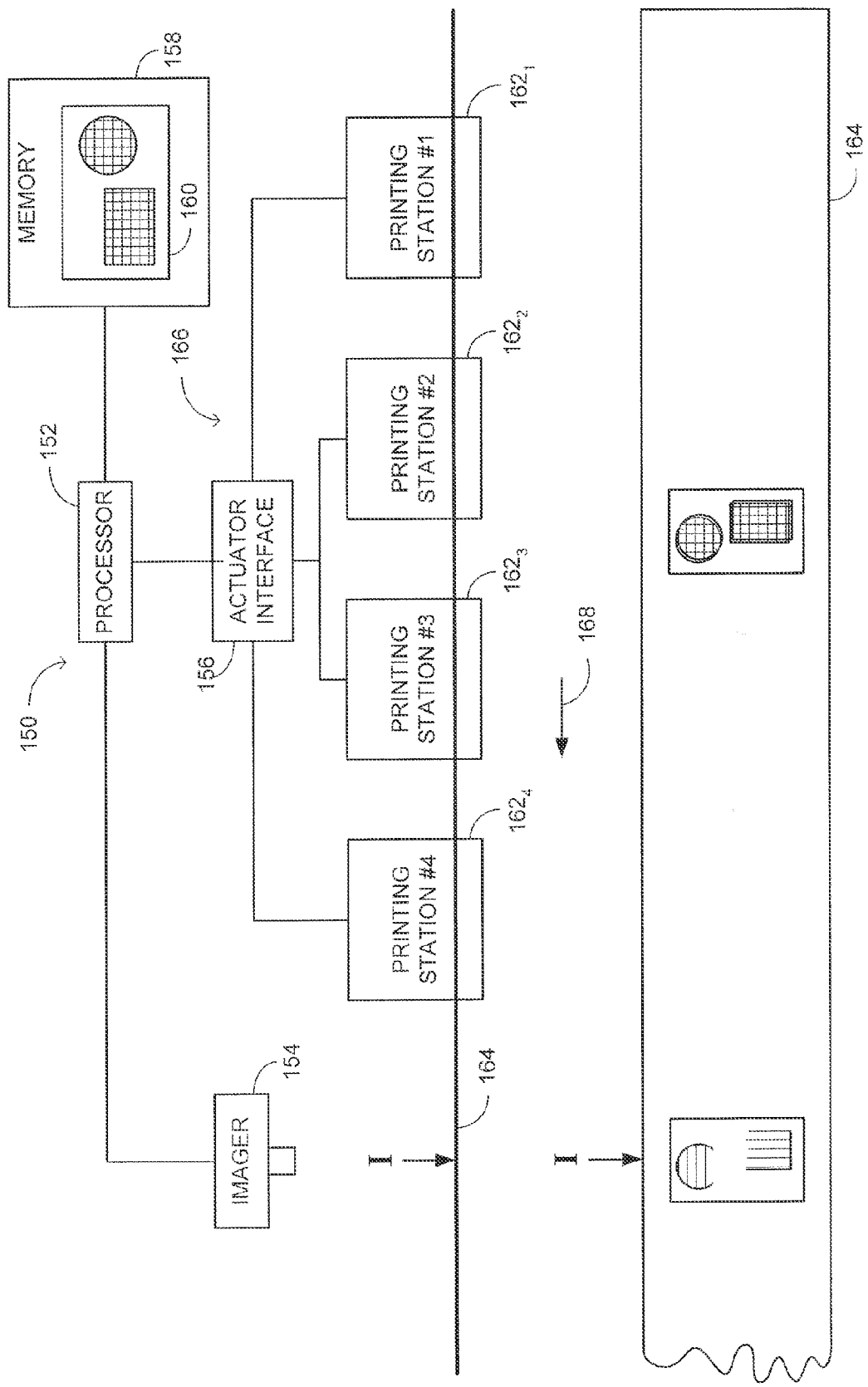
FIG. 3 is schematic illustration of a system for registering printing stations in a printing press, constructed and operative in accordance with a further embodiment of the disclosed technique.

Reference is now made to FIG. 3, which is schematic illustration of a system, generally referenced 150, for registering printing stations in a printing press, constructed and operative in accordance with a further embodiment of the disclosed technique. System 150 includes a processor 152, an imager 154, an actuator interface 156 and a memory 158. Processor 152 is coupled with imager 154 with actuator interface 156 and with memory 158. Actuator interface 156 is coupled with respective actuators (not shown) of rollers (not shown) of printing stations $162_1$, $162_2$, $162_3$ and $162_4$. Memory 158 stores a reference image 160 of the multi-color image to be printed. Reference image 160 includes the different color layers from which the multi-color composite image to be printed is composed. A web 164 passes through a plurality of rollers (not shown) of each of printing stations $162_1$, $162_2$, $162_3$ and $162_4$, in sequence, in a direction designated by an arrow 168. Each one of printing stations $162_1$, $162_2$, $162_3$ and $162_4$ is associated with a respective color image (e.g., corresponding a respective color layer in the reference image). Each one of printing stations $162_1$, $162_2$, $162_3$ and $162_4$ prints the respective color image thereof on web 164. Printing stations $162_1$, $162_2$, $162_3$ and $162_4$, together with web 164, constitute a printing press 166. Imager 154 may be embodied as a line-scan imager, which includes one-dimensional line detector such as a Charged Coupled Device (CCD) detector, a Complementary Metal Oxide Semiconductor (CMOS) detector and the like, that acquires a plurality of one-dimensional images. The plurality of one-dimensional images, form a two-dimensional spatial image. Alternatively, imager 154 can be embodied as an area camera, which includes a two-dimensional area detector that acquires a two-dimensional spatial image directly. Imager 154, being either a line scan camera or an area camera may be a color imager, which acquires images, where the color of each pixel is associated with a respective location in a selected color space, such as RGB (Red Green and Blue), CYMK (Cyan Yellow Magenta and Black), CIEXYZ and the like.

Following is a description of chromatic separation registration. Reference is now made to FIGS. 4A-4H, which are schematic illustrations of the stages of the chromatic separation registration of two un-registered printing stations printing the respective color images thereof, in accordance with another embodiment of the disclosed technique, and referring to FIG. 3. Each of the two un-registered color images is printed by the respective one of printing station $162_1$, $162_2$, $162_3$ and $162_4$ of printing press 166.

Figure 4A:
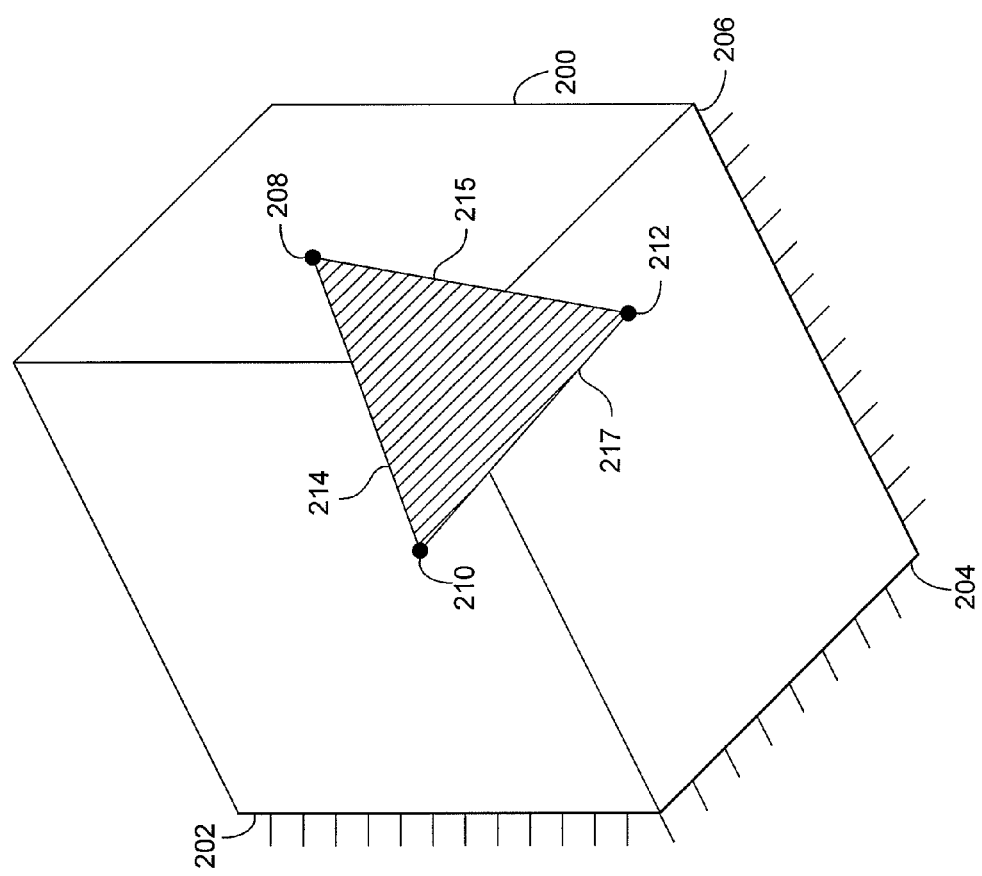
FIGS. 4A-4H are schematic illustrations of the stages of the chromatic separation registration of two un-registered printing stations printing the respective color images thereof, in accordance with another embodiment of the disclosed technique.

Initially, a color space 200 is selected, for example, by the user of the system or by the designer of the multi-color image to be printed. This color space is, for example, the RGB color space, the CMKY color space, the CIEXYZ color space, the CIELab color space, CIELuv color space and the like. In FIGS. 4A-4E, color space 200 is, for example, the RGB color space and includes three dimensions 202, 204 and 206. Each one of dimensions 202, 204 and 206 corresponding to one of the basic colors. With reference to FIGS. 3 and 4A, processor 152 determines a color projection plane 214 in color space 200. Color projection plane 214 is defined by the location (i.e., the color coordinates), in color space 200, of each of the two colors respective of the selected colors images and the location in color space 200 of the background (i.e., the color of the web). For example, point 208 in FIG. 4A, corresponds to the location of the color represented by the horizontal lines in FIG. 1, point 210 in FIG. 4A, corresponds to the location of the color represented by the vertical lines in FIG. 1 and point 212 corresponds to the location of the color of the background of the image to be printed.

In the example brought forth, color space 200 is a linear space. The intensity values (e.g., between 0 and 255) of the each selected color, are located on a line between the location of the background color and the location of the corresponding color. For example, the intensity values of the color corresponding to point 208 (i.e., the color represented by the horizontal lines in FIG. 1) are located on line 215. The intensity values of the color corresponding to point 210 (i.e., the color represented by the vertical lines in FIG. 1) are located on line 217. Line 215 and line 217 intersect at point 212 (i.e., corresponding to the color of the background). These two lines define color projection plane 214. In a linear space, color projection plane 214 is an affine plane. Points on this plane represent the different combinations of the two selected colors. In general, when the selected color space is not linear, location of the background and the two selected colors define a two-dimensional manifold.

Processor 152 determines the coordinates of the selected colors and the background from a reference image 160, stored in memory 158, where the different color layers of the multi-color image to be printed are defined. Alternatively, each printing station separately prints the respective color image thereof and imager 154 acquires a respective different image of each printed color image. Furthermore, imager 154 acquires an image of the web without any matter printed thereon. Imager 154 provides these respective different images and the image of the web without any matter printed thereon, to processor 152. Processor 152 determines the color coordinates of the pixels in each respective different image and of the image of the web in selected color space 200. In case the color space employed by imager 154 is different from selected color space 200, processor 152 transforms the color coordinates values of the pixels in the acquired image to correspond to coordinates in selected color space 200.

Figure 4C:
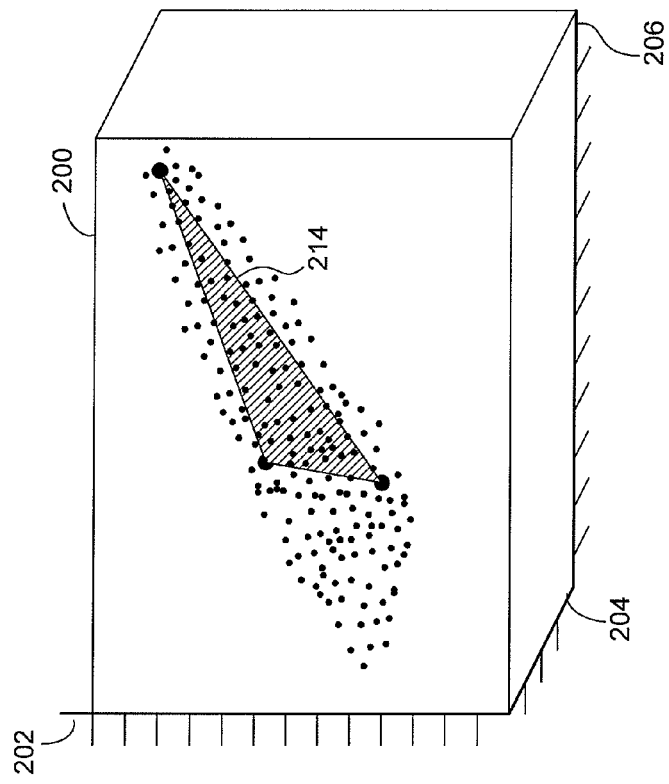
Figure 4B:
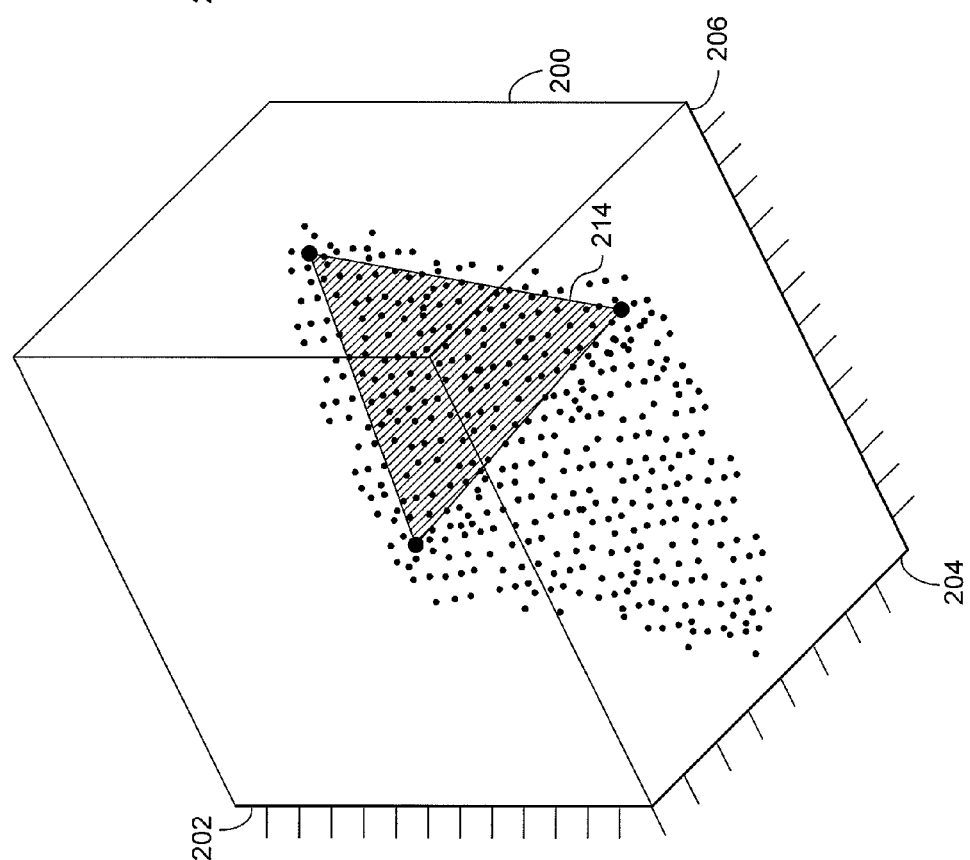

To register the two color images, printing press 166 prints the two selected color images on web 164 simultaneously. The result is for example, image 120 (FIG. 2). Imager 154 acquires an image of the printed color images and provides this acquired image to processor 152. The acquired image includes a plurality of pixels. Each pixel exhibits a respective color associated with a respective location in color space 200. FIGS. 4B and 4C, depict the location (i.e., the color coordinates), in color space 200, of the color of each pixel in the acquired image, along with projection plane 214.

Figure 4E:
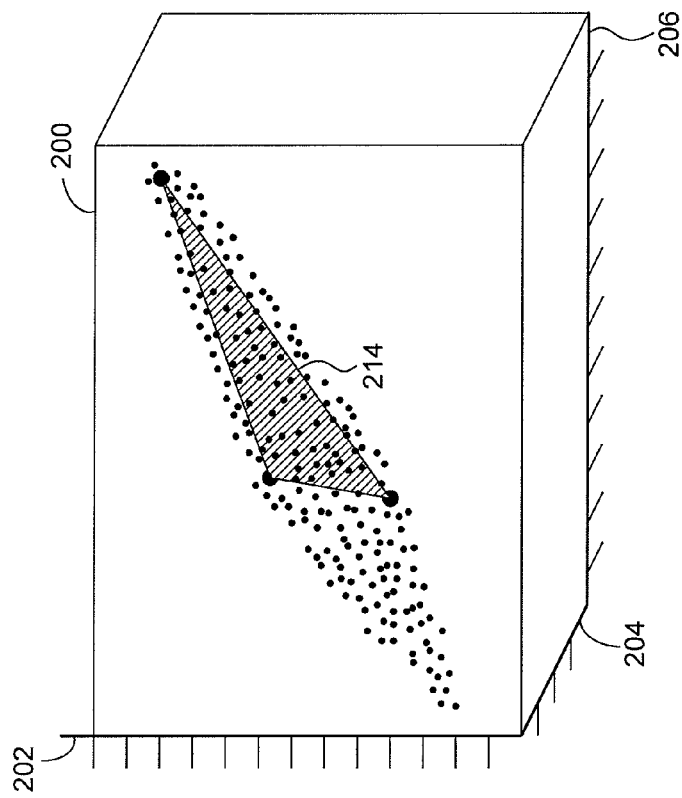
Figure 4D:
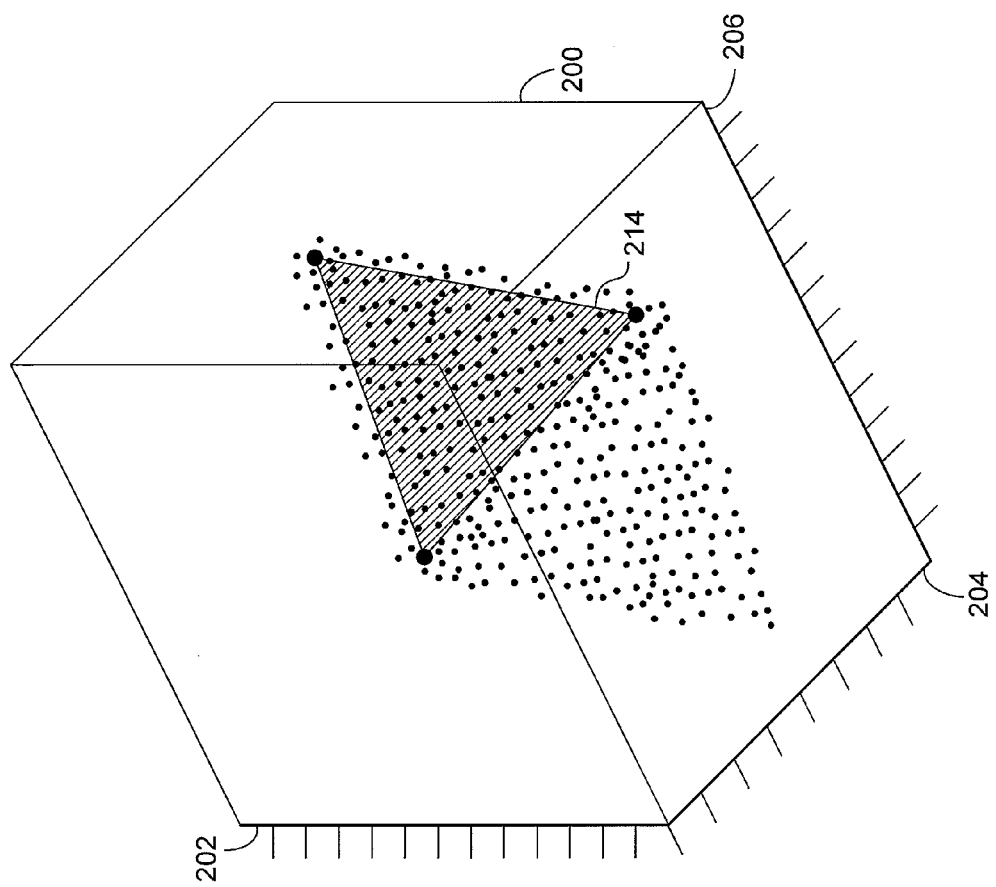

Thereafter, With reference to FIGS. 4D and 4E processor 152 projects the location of each pixel onto color projection plane 214. Processor 152 determines the projection of a pixel onto color projection plane 214 according to the point of intersection of a line (not shown) with color projection plane 214, the line being perpendicular to color projection plane 214 and passing through the location of the pixel.

Figure 4F:
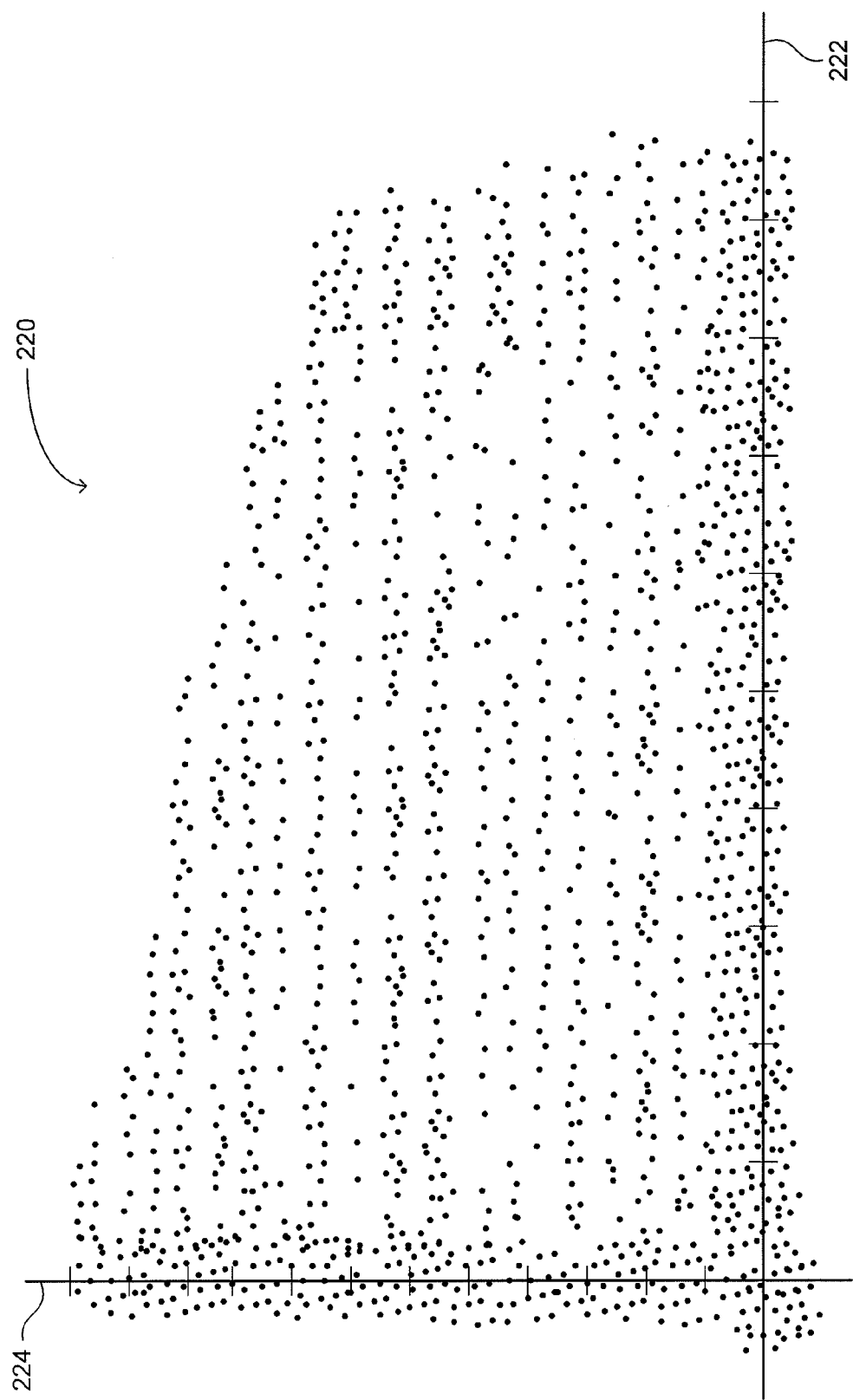

With reference to FIG. 4F, processor 152 transforms color projection plane 164 into a two-dimensional color separation space, generally reference 220. Two-dimensional color separation space 220 includes two axes, axis 222 and axis 224. Axis 222 corresponds to a vector connecting the background color to one color of one of the selected color images and axis 224 corresponds to a vector connecting the background color to the other color of the other selected color image. In other words, two-dimensional color separation space 220 is determined by selecting the location of the background color in color space 200 and two axes on color projection plane 214, which correspond to the two selected colors. Points 208, 210 and 212 (FIG. 4A) also define a parallelogram. However since this parallelogram may exceed beyond the boundaries of color space 200 (i.e., the parallelogram is clipped), the boundaries of color space 200 together with points 208 210 212 define the clipped parallelogram. Processor 152 transforms this clipped parallelogram into a unit square. Processor 152 also applies this transformation to each of the projected pixel locations on color projection plane 214 (FIG. 4A). Thus, each projected pixel location is associated with a respective location (i.e., coordinates) in two-dimensional color separation space 220. It is noted that, since in the example brought forth, color space 200 is a linear space, two-dimensional color separation space 220 is an affine space. It is further noted the when coordinate values of the pixels in two-dimensional color separation space 220 exceeded the limits of the space, the coordinate of these exceeding pixels are clipped to the limits of the space.

Figure 4G:
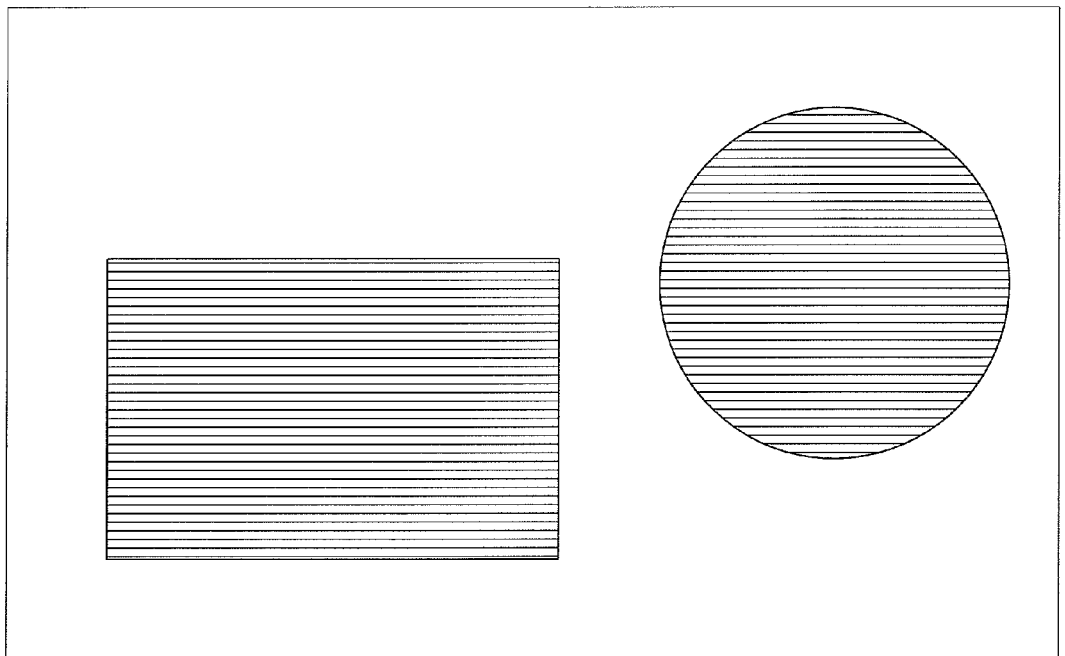
Figure 4H:
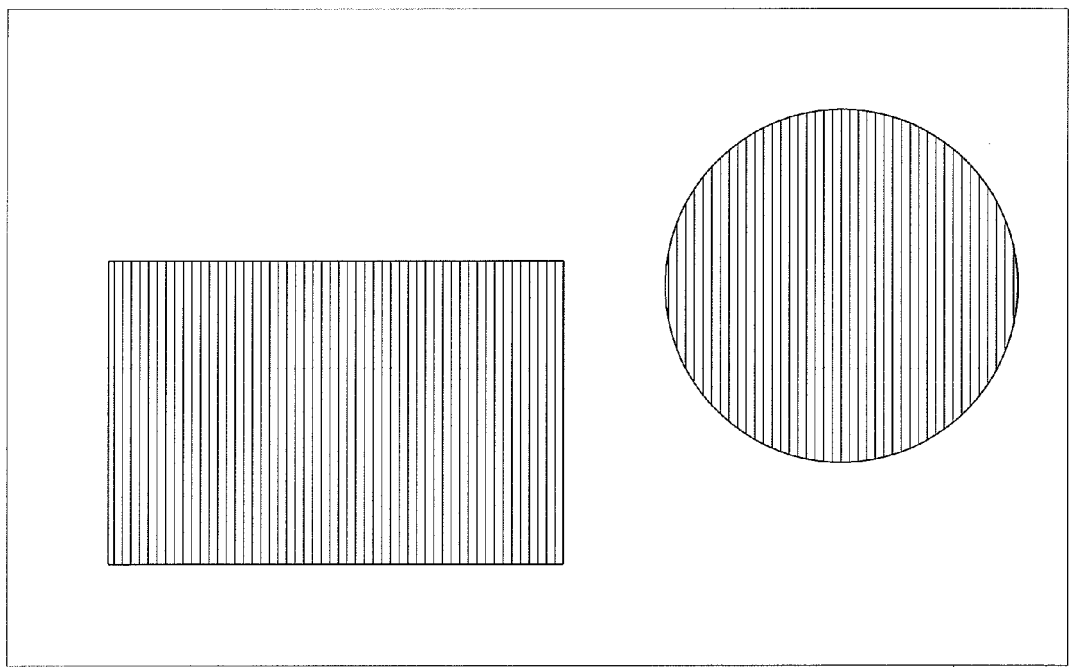

With reference to FIGS. 4G and 4H, processor 152 determines a respective monochrome image for each color from the location of each pixel in two-dimensional color separation space 220. The coordinate of each pixel in two-dimensional color separation space 220 represents the contribution of each selected color to the color of the pixel. In other words, each pixel in the original image is associated with two values representing the contribution of each selected color to the color of the pixel, one value associated with axis 222 and the other value associated with axis 224. Arranging these values into two respective images, each image being determined according to the values associated with one axis, results in two images, each representing one of the selected colors. These images are referred to herein as 'monochrome images'.

Processor 152 determines a first monochrome image 230 for the color represented by the horizontal lines and a second monochrome image 232 for the color represented by the vertical lines. Processor 152 determines each of first monochrome image 230 and second monochrome image 232 according to the values of the coordinates of the pixels, corresponding to a respective one of the axes of two-dimensional color separation space 220. For example, processor 152 determines first monochrome image 230 according to the coordinate values corresponding to axis 222 of the pixels. Processor 152 determines second monochrome image 232 according to the coordinate values corresponding to axis 224. Processor 152 registers first monochrome image 230 and second monochrome image 232 one with respect to the other directly. Alternatively, processor 152 registers each of first monochrome image 230 and second monochrome image 232 with respect to a reference image and thus with each other. Once processor 152 registers first monochrome image 230 and second monochrome image 232 one with respect to the other, processor 152 instructs actuator interface 156 to move the rollers of at least one of the respective ones of printing stations $162_1$, $162_2$, $162_3$ and $162_4$ to the registered locations thereof.

Figure 5:
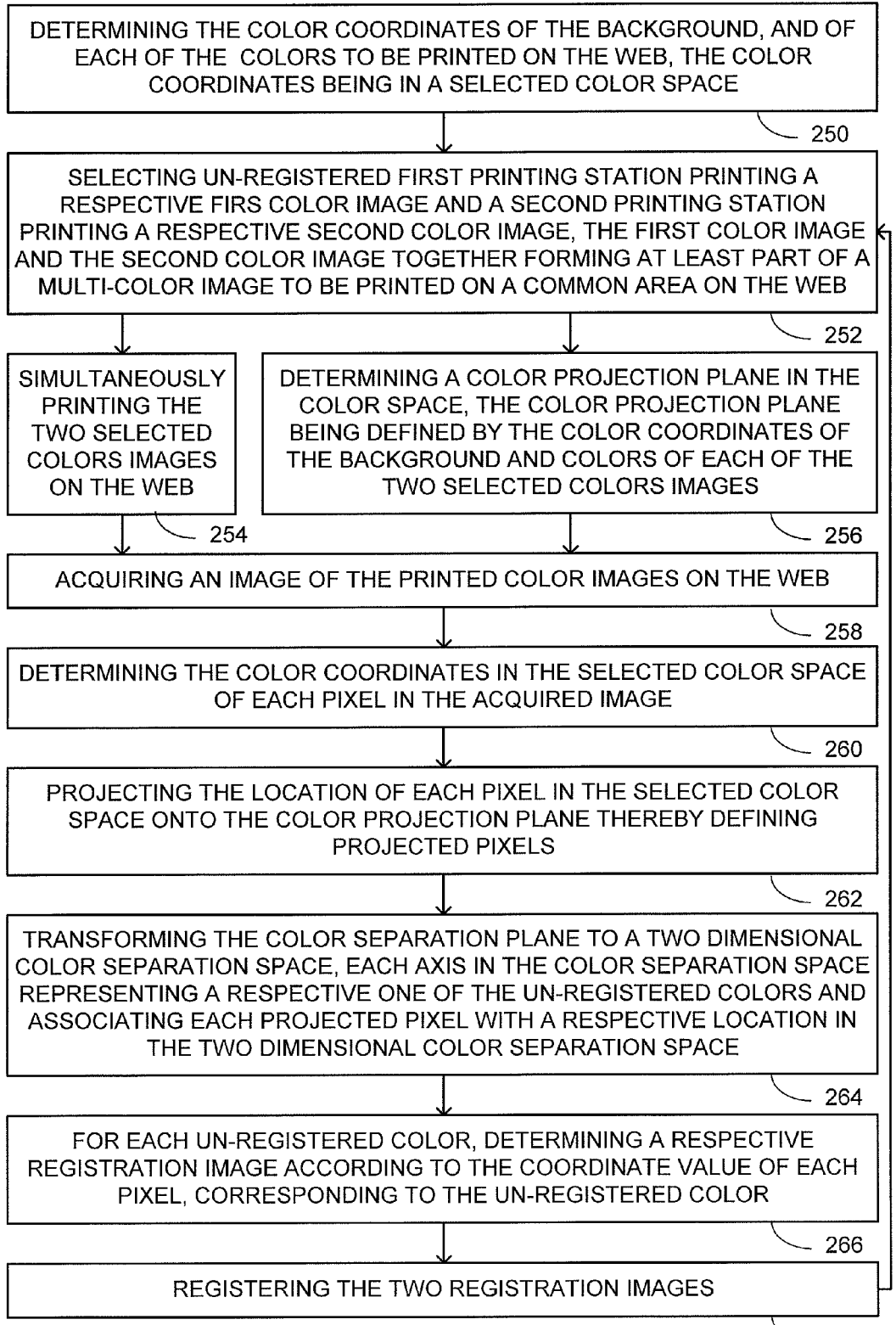
FIG. 5 is a schematic illustration of a method for registering the printing stations of a printing press without the use of registration marks or targets, operative in accordance with a further embodiment of the disclosed technique.

Reference is now made to FIG. 5, which is a schematic illustration of a method for registering the printing stations of a printing press without the use of registration marks or targets, operative in accordance with a further embodiment of the disclosed technique. In procedure 250, the color coordinates of the background, and of each of the colors to be printed on the web are determined, the color coordinates of the background and of the colors to be printed are determined in a selected color space (e.g., RGB, CMKY, CIEXYZ, CIELab, CIELuv and the like). With reference to FIGS. 3 and 4A, processor 152 determines color projection plane 214 in color space 200.

In procedure 252, an un-registered first printing station printing a respective first color image and second printing station printing a respective second color image are selected. The first color image and the second color image together forming at least part of a multi-color image to be printed on a common area on the web. With reference to FIG. 3, processor 152 selects an un-registered first printing station printing a respective first color image and second printing station printing a respective second color image. After procedure 252, the method proceeds to procedure 254 and to procedure 256.

In procedure 254, the two selected colors images are printed simultaneously on the web. With reference to FIG. 3, printing press 166 prints the two selected color images.

In procedure 256, a color projection plane is determined in the selected color space. The color projection plane is defined by the coordinates of the background (i.e., the web) and the coordinates of each of the two selected colors in the selected color space. The coordinates of the color of the web and the coordinates of each of the two selected colors, in the selected color space are determined by from a reference image. The reference image defines the different color layers of the multi-color image to be printed. Alternatively, each printing station separately prints the respective color image thereof and a respective different image of each printed color image is acquired. Also, an image of the web without any matter printed thereon is acquired. Thereafter, the color coordinates in selected color space of the pixels in each respective different image and of the image of the web is determined. With reference to FIGS. 3 and 4A, processor 152 determines color projection plane 214 in color space 200.

In procedure 258, an image of the color images printed on the web is acquired. This image may be acquired by an area color imager. Alternatively, a plurality of one-dimensional images are acquired by a line-scan color camera and combined into a two-dimensional image. With reference to FIG. 3, imager 154 acquires an image of the printed color images.

In procedure 260, the color coordinates in the selected color space, of each pixel in the acquired image, are determined. The color of each pixel is associated with respective color coordinates (i.e., a location) in the selected color space. With reference to FIGS. 3, 4B and 4C, processor 152 determines the color coordinates of each pixel in the acquired image, in color space 200.

In procedure 262, the location of each pixel of the acquired image, in the selected color space, is projected onto the color projection plane, thereby defining projected pixels. Accordingly, all the projected pixels are located on the color projection plane. With reference to FIGS. 3, 4D and 4E, processor 152 projects the location of each pixel of the acquired image, in the selected color space, onto color projection plane 214.

In procedure 264, the color projection plane is transformed into a two-dimensional color separation space. Each axis in the two-dimension color separation space represents a respective one of the printed colors. Accordingly, each projected pixel is associated with a respective coordinates in the two-dimensional color separation space. As mentioned above, the coordinates of background and of each of the two selected colors in the selected color space together with color space 200 define a parallelogram. This parallelogram may be transformed into a unit square defining a two-dimensional space. With reference to FIGS. 3 and 4F, processor 152 transforms color projection plane 214 into two-dimensional color separation space 220.

In procedure 266, a respective monochrome image is determined for each un-registered color. This monochrome image is determined according to the coordinate value of each pixel (i.e., in the two-dimensional color separation space) corresponding to the un-registered color. With reference to FIGS. 3, 4F, 4G and 4H, processor 152 determines a first monochrome image 230 according to according to the coordinate values corresponding to axis 222 of the pixels. Processor 152 determines second monochrome image 232 according to the coordinate values corresponding to axis 224.

In procedure 268, the two monochrome images are registered one with respect to the other. Thus, the two printing stations associated with to the two selected color images are registered one with respect to the other. With reference to FIG. 3, processor 152 then registers first monochrome image 230 and second monochrome image 232 one with respect to the other directly. Alternatively, processor 152 registers first monochrome image 230 with second monochrome image 232 using a reference image (e.g., a Portable Document Format—PDF). After procedure 218, the method returns to procedure 252 to register another pair of un-registered color images. The method will repeat until N−1 pairs of printing stations have been registered, where N is the number of printing stations in the printing press. It is noted that the set of N−1 pairs must include each printing station at least once (i.e., each printing station should print at least once).

The N−1 pairs are selected according to a cost function determined for each possible pair of printing station. The cost function is determined according to two values, a spatial value and a chromatic value. The spatial value corresponds to the overlap in the design features in the corresponding reference color images (i.e., the corresponding color layer in the reference image) of each pair of printing stations. The chromatic value corresponds to the dot product of two vectors. The first vector being defined according to the location (i.e., in the selected color space) of the background and the location of the first color and the second vector is defined according to the location of the background and the location of the second color. The dot product between these vectors is also referred to herein as the 'color vector dot product'

Figure 6B:
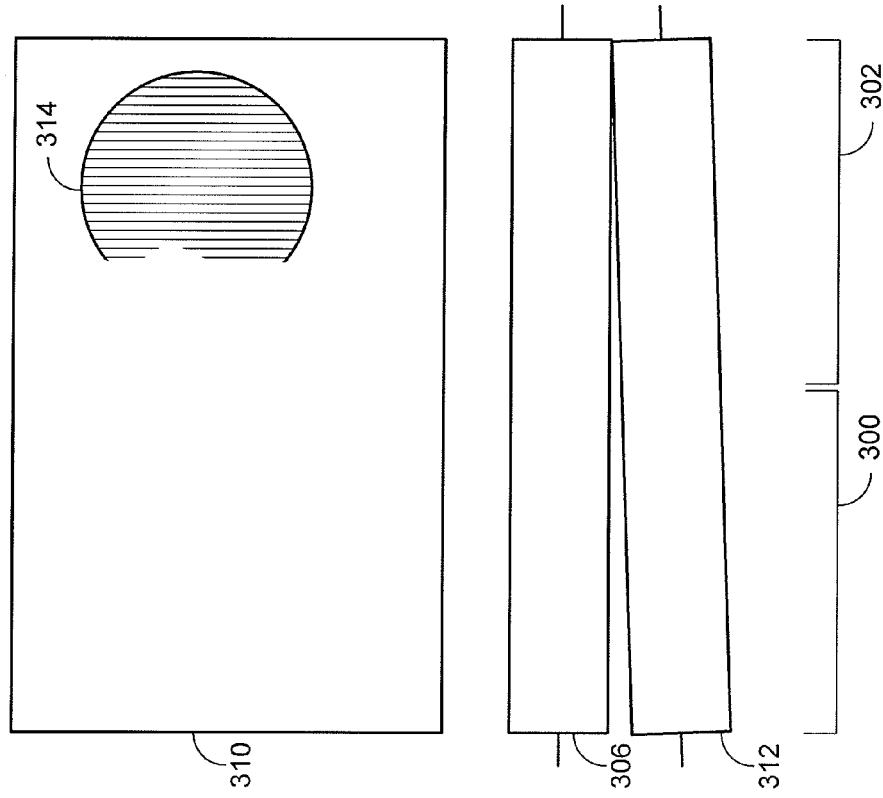
FIGS. 6A-6C are schematic illustrations of the stages of the spatial separation registration of two un-registered printing stations printing the respective color images thereof, in accordance with another embodiment of the disclosed technique.
Figure 6A:
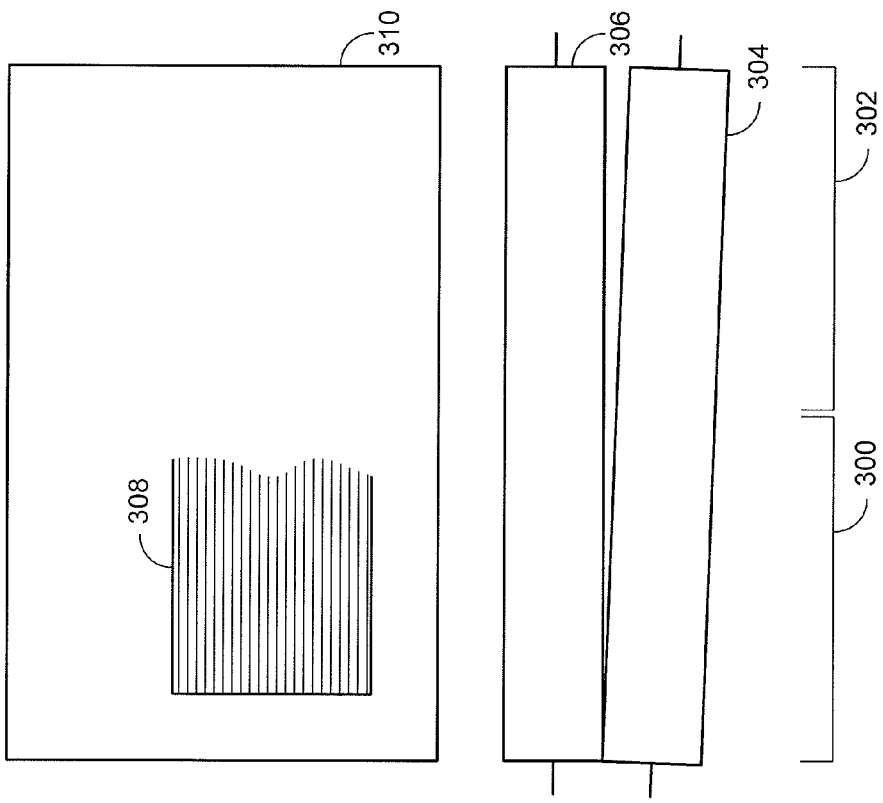
Figure 6C:
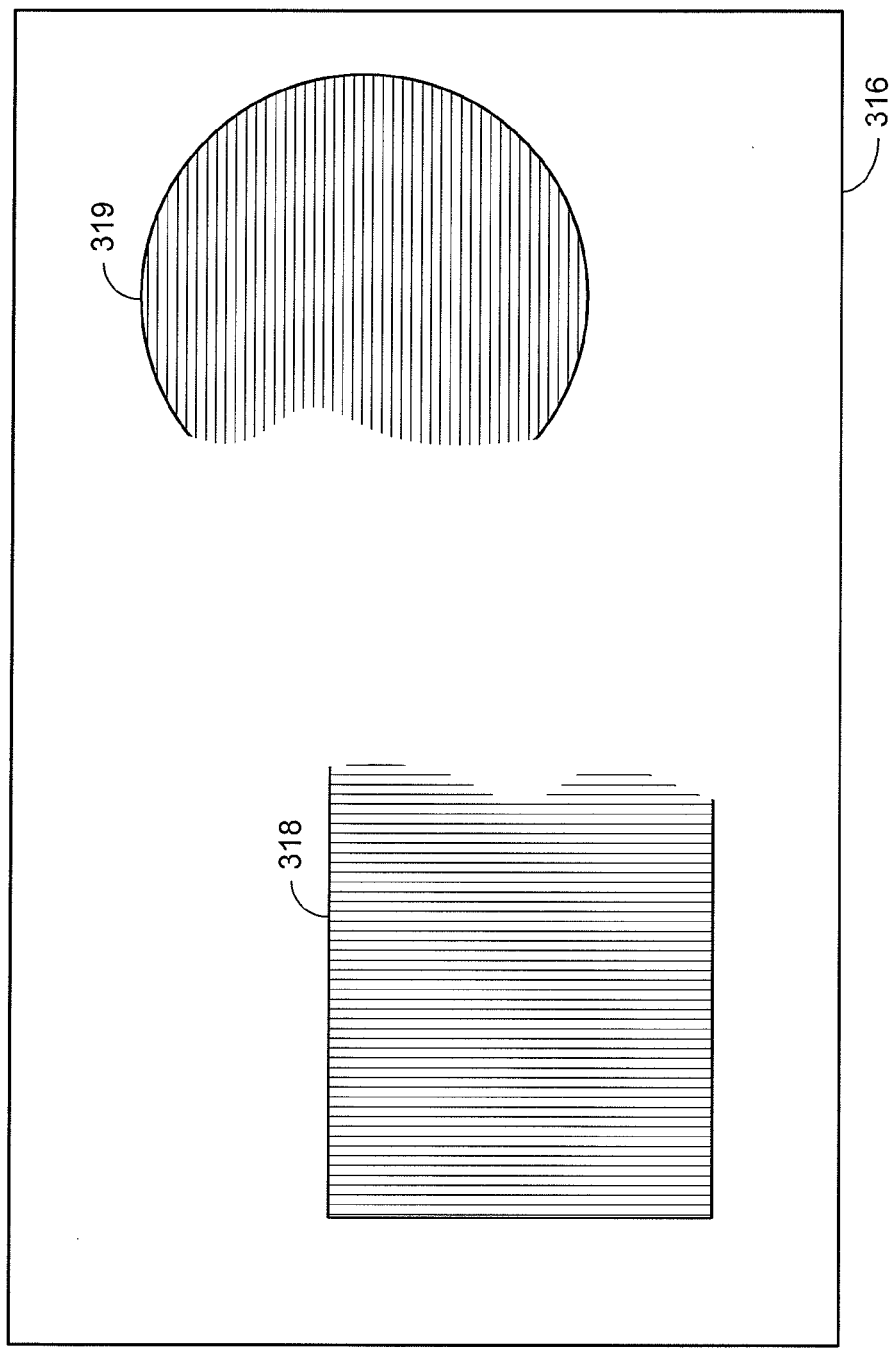

As the overlap between the design features of each selected pair of reference color images increases, the first value decreases. As the above mentioned dot product decreases (i.e., the angle between the vectors approaches ninety degrees), the second value decreases. The overlap between the design features in the reference color images determined by determining the number common pixel locations, which corresponds to a design feature to be printed, in the reference color images. The images may be dilated prior to the determining the overlap to allow for the miss-registration between the printing stations. The cost function is a weighted sum of the above spatial and chromatic values. The N−1 pairs of printing stations, are selected to form the minimum spanning tree (i.e., in terms of the cost function) in a connected weighted graph, where each station is a node in the graph. In other words, the N−1 printing stations, which the corresponding color images thereof exhibit substantial overlap in the design features, and the color vector dot product is small are selected Following is a description of the spatial separation registration. Reference is now made to FIGS. 6A-6C, which are schematic illustrations of the stages of the spatial separation registration of two un-registered printing stations printing the respective color images thereof, in accordance with another embodiment of the disclosed technique and referring to FIG. 3. In FIGS. 6A and 6B, side 300 is defined as the driver side of the web and side 302 is defined as the operator side of the web. FIG. 6A, depicts a plate roller 304, corresponding to printing stations $162_1$, $162_2$, $162_3$ and $162_4$ printing a first color image of the multi-color image to be printed. Processor 152 instructed actuator interface 156 to position plate roller 304 at an angle with respect to an impression roller 306, such that driver side 300 of plate roller 304 is in contact with the web, while operator side 302 of plate roller 304 is not in contact with the web. Consequently, only a portion of rectangle 308 is printed on the common area 310 of the web. The color of this first color image is represented by horizontal lines.

FIG. 6B, depicts a plate roller 312, corresponding to another one of printing stations $162_1$, $162_2$, $162_3$ and $162_4$ printing a second color image of the multi-color image to be printed. Processor 152 instructed actuator interface 156 to position plate roller 312 at an angle with respect to impression roller 306, such that operator side 302 of plate roller 312 is in contact with the web, while driver side 300 of plate roller 312 is not in contact with the web. Consequently, only a portion of circle 314 is printed on the common area 310 of the web. The color of this second color image is represented by vertical lines.

With reference to FIG. 6C, once the portion of the first color image and the portion of the second color image are printed on the common area 310 on the web, imager 154 acquires an image 316 of the common area. Image 316 includes a representation 318 of the portion of rectangle 308 on the driver side thereof and a representation 319 of the portion of circle 314 of the operator side thereof. Processor 152 registers the driver side of image 316 with layer of reference image 160, stored in memory 158, corresponding to the first color image. Processor 152 further registers the operator side of image 316 with the layer of reference image 160 corresponding to the second color image. Consequently, the two colors images, and consequently the respective printing stations thereof, are registered one with respect to the other. Once processor 152 registers the operator side and the driver side of image 316, processor 152 instructs actuator interface 156 to move the rollers of at least one of the respective ones of printing stations $162_1$, $162_2$, $162_3$ and $162_4$ to the registered locations thereof.

Figure 7:
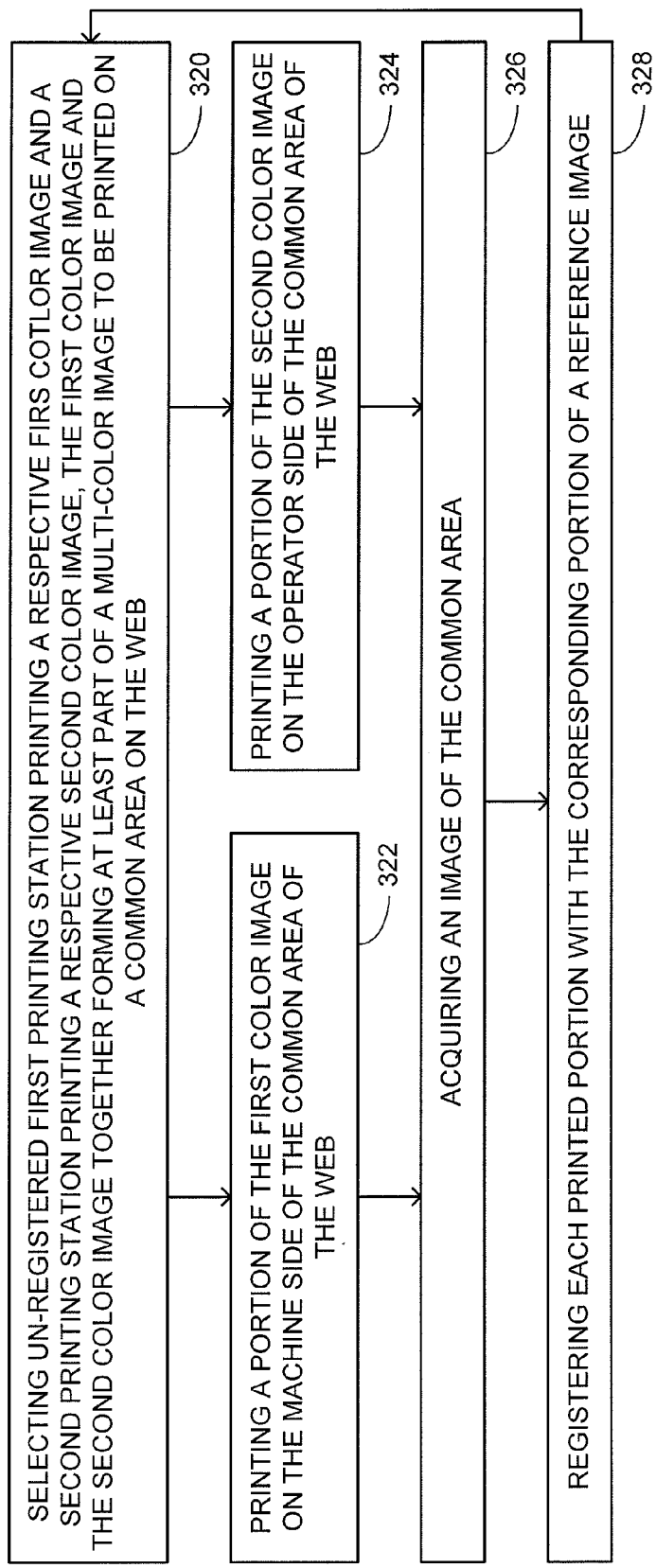
FIG. 7 is a schematic illustration of a method for registering the printing stations of a printing press without the use of registration marks or targets, operative in accordance with a further embodiment of the disclosed technique.

Reference is now made to FIG. 7, which is a schematic illustration of a method for registering the printing stations of a printing press without the use of registration marks or targets, operative in accordance with a further embodiment of the disclosed technique. In procedure 320, un-registered first printing station printing a respective first color image and a second printing station printing a respective second color image are selected. The first color image and the second color image together forming at least part of a multi-color image to be printed on a common area on the web. With reference to FIG. 3, processor 152 selects an un-registered first printing station printing a respective first color image and second printing station printing a respective second color image.

In procedure 322, a portion of the first color image is printed on the driver side of the common area. Printing a portion of the first color image on the driver side of the common area is achieved by positioning the plate roller at an angle with respect to the impression roller. With reference to FIGS. 3 and 6A, processor 152 instructed actuator interface 156 to position plate roller 304 at an angle with respect to an impression roller 306, such that driver side 300 of plate roller 304 is in contact with the web, while operator side 302 of plate roller 304 is not in contact with the web.

In procedure 324, a portion of the second color image is printed on the operator side of the common area of the web. Printing a portion of the second color image on the operator side of the common area is achieved by positioning the plate roller at an angle with respect to the impression roller. With reference to FIGS. 3 and 6B, processor 152 instructed actuator interface 156 to position plate roller 312 at an angle with respect to impression roller 306, such that operator side 302 of plate roller 312 is in contact with the web, while driver side 300 of plate roller 312 is not in contact with the web.

In procedure 326, an image of the common area is acquired. The acquired image includes representation of the printed portions of each color image. One side of the acquired image includes a representation of the portion of the color image printed on the driver side of the web. The other side of the acquired image includes a representation of the portion of the color image printed on the operator side of the web. With reference to FIGS. 3 and 6C, imager 154 acquires an image 316 of the common area. Image 316 includes a representation 318 of the portion of rectangle 308 on the driver side thereof and a representation 320 of the portion of circle 314 of the operator side there.

In procedure 328, each representation of the printed portions of each color image in the acquired image is registered with the respective layer of a reference image corresponding to the color respective of that representation. The driver side of the acquired image is registered with the layer of the reference image corresponding to the first selected color image. The operator side of the acquired image is registered with the layer of the reference image corresponding to the second selected color image. Consequently, the two colors are registered one with respect to the other. With reference to FIG. 3, processor 152 registers the driver side of image 316 with layer of reference image 160, stored in memory 158, corresponding to the first color image. Processor 152 further registers the operator side of image 316 with the layer of reference image 160 corresponding to the second color image.

According to another embodiment of the disclosed technique, chromatic separation and spatial separation are employed simultaneously to register four different printing stations (i.e., simultaneously). Accordingly, two printing stations print portions of the respective color images thereof on the driver side of the common area on web and two different printing stations print portions the respective color images thereof on the operator side of common area on the web. An imager acquires an image of the common area. The representations of the portions printed on the driver side of the web are chromatically separated as described above. The representations of the portions printed on the operator side of the web are also chromatically separated as described above. Thus, four monochrome images are produced. These monochrome images are then registered with respect to a reference image and thus with respect to each other. Accordingly, the respective printing stations are also registered.

Figure 8:
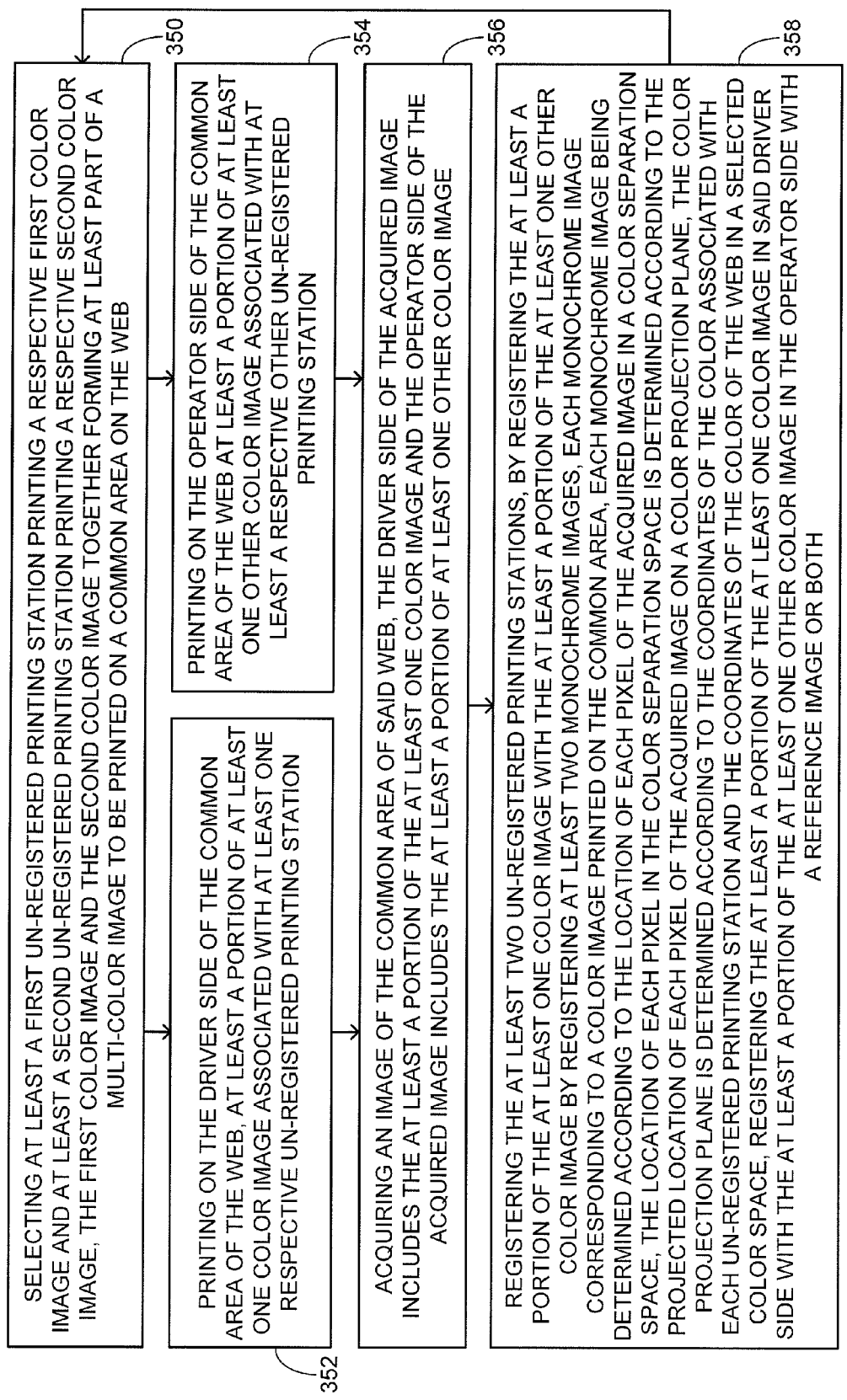
FIG. 8 is a schematic illustration of a method for registering the printing stations of a printing press without the use of registration marks or targets, operative in accordance with another embodiment of the disclosed technique.

Reference is now made to FIG. 8, which is a schematic illustration of a method for registering the printing stations of a printing press without the use of registration marks or targets, operative in accordance with another embodiment of the disclosed technique. In procedure 350, at least a first un-registered printing station printing and a second un-registered printing stations are selected. The first un-registered prints station printing a respective first color image and the second un-registered printing station prints a respective second color image. The first color image and the second color image together forming at least part of a multi-color image to be printed on a common area on the web. With reference to FIG. 3, processor 152 selects at least two un-registered printing stations In procedure 352, at least a portion of at least one color image associated with at least one respective un-registered printing station is printed on the driver side of the common area of the web. With reference to FIG. 3, one of printing stations $162_1$, $162_2$, $162_3$ and $162_4$ being a selected un-registered printing station prints, at least a portion of at least the color image associated therewith on the driver side of the common area of the web.

In procedure 354, at least a portion of at least one other color image associated with at least a respective other un-registered printing station is printed on the operator side of the common area of the web. With reference to FIG. 3, one of printing stations $162_1$, $162_2$, $162_3$ and $162_4$ being a selected un-registered printing station prints, at least a portion of at least the color image associated therewith on the operator side of the common area of the web.

In procedure 356, an image of the common area of the web is acquired. The driver side of the acquired image includes the at least a portion of the at least one color image and the operator side of the acquired image includes the at least a portion of at least one other color image In procedure 358, the at least two un-registered printing stations are registering by registering the at least a portion of the at least one color image with the at least a portion of the at least one other color image according either one of the following or both:
  registering at least two monochrome images. Each monochrome image corresponding to a color image printed on the common area. Each monochrome image being determined according to the location of each pixel of the acquired image in a color separation space. The location of each pixel in the color separation space is determined according to the projected location of each pixel of the acquired image on a color projection plane. The color projection plane is determined according to the coordinates of the color associated with each un-registered printing station and the coordinates of the color of the web in a selected color space.
  registering the at least a portion of the at least one color image in the driver side with the at least a portion of the at least one other color image in the operator side with a reference image or both.

With reference to FIG. 3, processor 152 registers the at least two un-registered printing stations.

As mentioned above, the monochrome images are registered either one with respect to the other or with respect to a reference image. In general, when registering two images, one image is defined as the 'source image' and the other image is defined as the 'target image'. Registration is achieved by two stages, the feature matching stage and the image transformation matching stage. Feature matching may be performed by identifying features in the source image and searching for corresponding features in the target image (e.g., by employing correlation). Alternatively, both images are divided into tiles and for each tile in the source image, searching for a corresponding tile in the target image.

Once features in the source image are matched with corresponding features in the target image, translation matching may be performed by determining a transformation matrix. The parameters of the transformation matrix are the parameters that minimize the sum of square distances between the locations (i.e., the coordinates in the image) of the pixels of the features in the source image and the corresponding features in the target image transformed into the source image. When only translation and rotation are of interest, the transformation matrix may be of the following form:

$$\begin{bmatrix} x_1 \\ y_1 \end{bmatrix} = \begin{bmatrix} \cos a & -\sin a & t_x \\ \sin a & \cos a & t_y \end{bmatrix} \begin{bmatrix} x_0 \\ y_0 \\ 1 \end{bmatrix} \quad (1)$$

where x0, y0 are location of a pixel in target image, x1, y1 the location of the corresponding pixel in the source image, α is the rotation angle tx and ty are the translation parameters.

When Translation, Rotation (e.g., caused by the miss-aligned printing plates), scale (i.e., different pixels size of the source image and the target image) and shear (e.g., when the imager is acquiring the image at an angle relative to the web), the transformation matrix may be of the following form:

$$\begin{bmatrix} x_1 \\ y_1 \end{bmatrix} \approx \begin{bmatrix} a & b & c \\ d & e & f \end{bmatrix} \begin{bmatrix} x0 \\ y0 \\ 1 \end{bmatrix} \quad (2)$$

where x0, y0 are location of a pixel in target image, x1, y1 the location of the corresponding pixel in the source image and a, b, c, d, e and f are matrix parameters.

It will be appreciated by persons skilled in the art that the disclosed technique is not limited to what has been particularly shown and described hereinabove. Rather the scope of the disclosed technique is defined only by the claims, which follow.

The invention claimed is:

1. A system for registering a printing press, said printing press including a plurality of printing stations each for printing a respective color image on a web, each of said printing stations being associated with a respective different color, at least two of said printing stations being un-registered, said system comprising:
  an imager acquiring an image of a common area of said web, a driver side of said acquired image including at least a portion of at least one color image associated with at least one respective un-registered printing station and an operator side of said acquired image including at least a portion of at least one other color image associated with at least a respective other un-registered printing station; and
  a processor, coupled with said imager, registering said at least two un-registered printing stations, by registering said at least a portion of said at least one color image with at least a portion of said at least one other color image according to at least one of the following:
  registering at least two monochrome images, each monochrome image corresponding to a color image printed on said common area, each monochrome image being determined according to the location of each pixel of said acquired image in a color separation space, said location of each pixel in said color separation space being determined according to the projected location of each pixel of said acquired image on a color projection plane, said color projection plane being determined according to the coordinates of the color associated with each said un-registered printing stations and the coordinates of the color of said web in a selected color space; and
  registering said at least said portion of said at least one color image in said driver side with said at least said portion of said at least one other color image in said operator side with a reference image; said processor instructing an actuator interface to position a plate roller of one of said at least two un-registered printing stations at an angle with respect to an impression roller of said printing press, such that said driver side of said plate roller is in contact with said web and prints said at least a portion of at least one color image associated with at least one respective un-registered printing station; and said processor instructing said actuator interface to position a plate roller of another one of said at least two un-registered printing stations at another angle with respect to said impression roller of said printing press such that said operator side of said plate roller is in contact with said web and prints said at least a portion of at least one other color image associated with at least a respective other un-registered printing station.

2. The system according to claim 1, wherein said actuator interface is coupled with said processor and with respective actuators of rollers of said at least two un-registered printing stations.

3. The system according to claim 1 further including a memory storing said reference image, said reference image includes the different color layers from which said image to be printed is composed.

4. The system according to claim 3, wherein said processor determines said coordinates of the color associated with each un-registered printing station and the coordinates of the color of the web according at least one of the following:
  the color of the respective color layer in said reference image associated with said at least two un-registered printing stations and the color of said web;
  each un-registered printing stations separately prints the respective color images thereof, said imager acquires a respective different image of each printed color image and an image of said web, said processor determines the coordinates of each color associated with each printed color image in said selected color space and the coordinates of the color of said web in said selected color space.

5. The system according to claim 1, wherein said processor instructs said actuator interface to move the rollers of at least one of said at least two un-registered printing stations to the registered locations thereof.

6. The system according to claim 1, wherein said selected color space is one of:
  RGB;
  CYMK;
  CIEXYZ;
  CIELab;
  CIELuv.

7. The system according to claim 1, wherein said imager is one of line-scan camera and area camera, and one of Charged Coupled Device and Complementary Metal Oxide Semiconductor.

8. The system according to claim 1, wherein said printing press is registered by registering N–1 pairs of printing stations, and
  wherein N is the number of printing stations in said printing press.

9. A method for registering a printing press, said printing press including a plurality of printing stations each for printing a respective color image on a web, each said printing stations being associated with a respective different color, at least two of said printing stations being un-registered, said method comprising the procedures of:
  printing on the driver side of a common area of said web, at least a portion of at least one color image associated with at least one respective un-registered printing station by positioning a plate roller of one of said at least two un-registered printing stations and an impression roller of said printing press at an angle therebetween, such that said driver side of said plate is in contact with said web;
  printing on the operator side of said common area of said web at least a portion of at least one other color image associated with at least a respective other un-registered printing station by positioning a plate roller of another of said at least two un-registered printing stations and an impression roller of said printing press at an angle therebetween, such that said operator side of said plate is in contact with said web;
  acquiring an image of said common area of said web, the driver side of said acquired image including said at least a portion of said at least one color image and the operator side of said acquired image including said at least a portion of at least one other color image;
  registering said at least two un-registered printing stations, by registering said at least a portion of said at least one color image with at least a portion of said at least one other color image according to at least one of the following:
    registering at least two monochrome images, each monochrome image corresponding to a color image printed on said common area, each said at least two monochrome images being determined according to the location of each pixel of said acquired image in a color separation space, said location of each said pixel in said color separation space being determined according to the projected location of each said pixel of said acquired image on a color projection plane, said color projection plane being determined according to the coordinates of the color associated with each said un-registered printing stations and the coordinates of the color of said web in a selected color space; and
    registering said at least said portion of said at least one color image in said driver side with said at least said portion of said at least one other color image in said operator side with a reference image.

10. The method according to claim 9, wherein said registering two monochrome images includes the sub-procedures of:
  determining the color coordinates of the background, and the color coordinates of each of the colors associated with said un-registered printing stations in said selected color space;

determining said color projection plane in said selected color space, said color projection plane is defined by the coordinates of said web and the coordinates of each of said two colors associated with said un-registered printing stations, in said selected color space;

determining the color coordinates, of each pixel in the acquired image, in said selected color space;

projecting said location of each pixel of the acquired image onto said color projection plane, thereby defining projected pixels;

transforming said color projection plane is into a two-dimensional color separation space, each axis in the two-dimension color separation space represents a respective one of said colors, thereby associating each projected pixel with respective coordinates in said two-dimensional color separation space;

determining said two monochrome images, each said monochrome images being determined according to the coordinate value of each pixel corresponding to one of said colors to be printed.

11. The method according to claim 10, wherein said printing press is registered by registering N−1 pairs of printing stations, and wherein N is the number of printing stations in said printing press.

12. The method according to claim 10, wherein said coordinates of the color associated with each un-registered printing station and the coordinates of the color of the web according are determined according to at least one of the following:

the color coordinates in said selected color space of the respective color layer in a reference image associated with said at least two un-registered printing stations and the color coordinates in said selected color space of said web;

according to the coordinates in said selected color space of pixels in respective acquired images of separately printed color images of each selected un-registered printing station and the coordinates in said selected color space of pixels in respective acquired image of said web.

13. The method according to claim 12, wherein said reference image defines the different color layers of the multi-color image to be printed.

14. The method according to claim 12, wherein each of said two monochrome images are registered with a respective layer of said reference image corresponding to the color respective of that monochrome image and thus with respect to each other.

* * * * *